Sept. 11, 1928.  1,683,751
C. M. ABBOTT
METHOD OF MAKING IMITATION HAND RIFT SHINGLES
Filed Oct. 11, 1926  2 Sheets-Sheet 1

Inventor
Charles M. Abbott
By
Attorney

Sept. 11, 1928.  
C. M. ABBOTT  
1,683,751  
METHOD OF MAKING IMITATION HAND RIFT SHINGLES  
Filed Oct. 11, 1926  
2 Sheets-Sheet 2
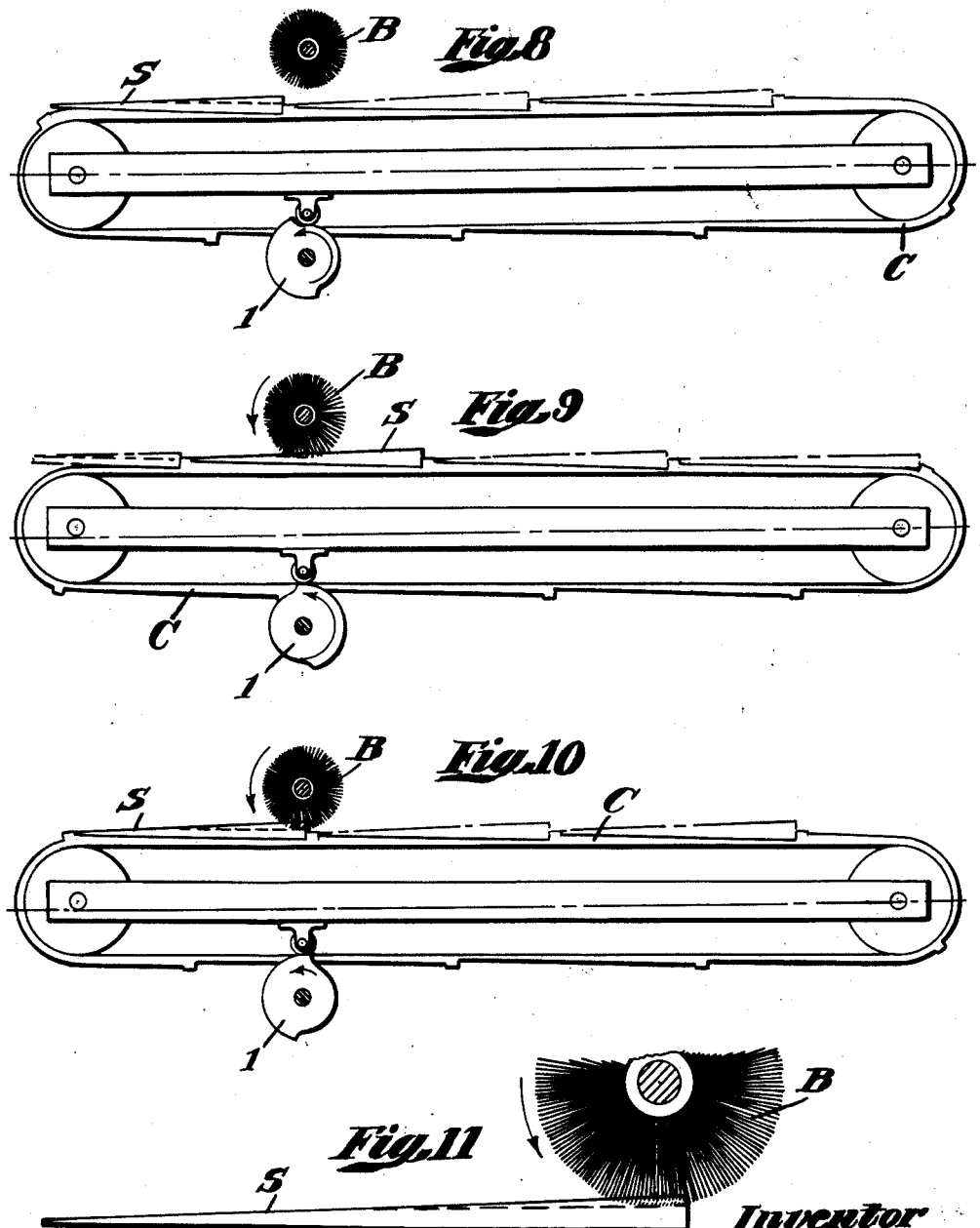

Patented Sept. 11, 1928.

1,683,751

UNITED STATES PATENT OFFICE.

CHARLES M. ABBOTT, OF WATERTOWN, MASSACHUSETTS, ASSIGNOR TO SAMUEL CABOT, INC., A CORPORATION OF MASSACHUSETTS.

METHOD OF MAKING IMITATION HAND-RIFT SHINGLES.

Application filed October 11, 1926. Serial No. 140,775.

The present application is a division of my pending allowed application, Serial No. 14,129, filed March 9, 1925, and involves a novel method of producing the imitation hand rift shingle described and claimed in said prior application.

As was pointed out in my prior application, there is a definite demand in the trade for the rift shingle, but on account of manufacturing costs such a shingle is too expensive for the average builder. Attempts have been made to produce an imitation shingle of this kind by machinery, usually by a gouging or rough sawing process intended to simulate the irregularities in surface texture of the split or rift shingle, but in general such imitations have not been successful either from the point of view of an imitation or from the manufacturing standpoint.

I discovered and claimed as a new article of manufacture in my said allowed application an imitation hand rift shingle in which the effect of the hand split or rift shingle was produced upon a sawed shingle by subjecting the sawed shingle to an abrading action which removed to a perceptible depth the softer layers of the shingle, while leaving the harder intermediate layers exposed in relief. The present application is directed to the method of producing such a shingle.

According to my method, the shingles are cut in planes radial to the vertical axis of the trunk. The smooth or substantially smooth surface of the shingle left by the saw is then subjected to an abrading action as by a wire brush, sand blast or the like, to produce the effect sought, the abrading tool, as for example the wire brush, preferably being stationarily mounted relative to the shingle and the shingle itself being progressively raised towards the abrading tool during its feed therepast, whereby to regulate the depth of surface cut according to the increasing thickness of the shingle from tip to butt.

In the accompanying drawings, I have indicated convenient apparatus for the practice of my method. In these drawings.

Figure 6:
Figure 7:

Figs. 6 and 7 are sections on the lines 6—6 and 7—7, respectively, of Fig. 5, and Figs. 8 to 11 inclusive are diagrams illustrating the progressive lifting action of the shingle to the abrading tool during its feed therepast.

Figure 1:
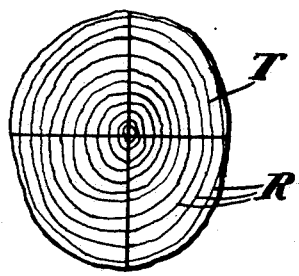
Fig. 1 is a diagrammatic section of a characteristic tree trunk, and indicating the lines of quarter-sawing.
Figure 3:
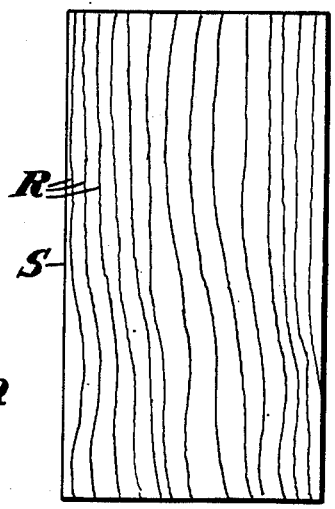
Fig. 3 is a plan view of one of the shingle blanks, preparatory to abrading treatment in accordance with my invention.
Figure 4:
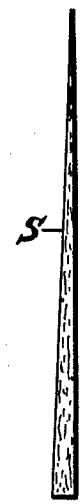
Fig. 4 is an edge view of Fig. 3.
Figure 2:
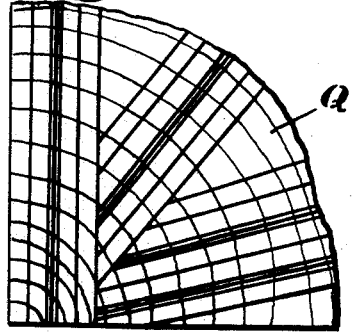
Fig. 2 is a similar view of one of the quarter-sawed slabs and indicating the lines of sawing of the individual shingle blank.
Figure 5:
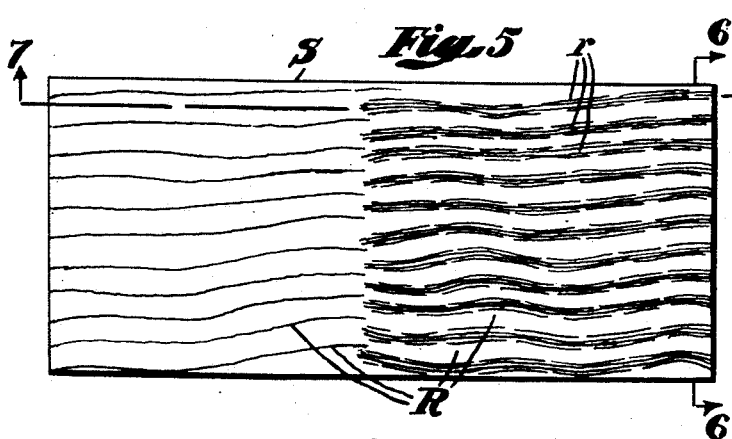
Fig. 5 is a plan view of a shingle treated in accordance with my method.

According to my invention, the tree trunk T is quarter-sawed in planes radial to its vertical axis (see Fig. 1). Each quarter slab Q is sawed along the lines of cut shown in Fig. 2 into individual shingle blanks S, one of which is shown in plan and edge elevation in Figs. 3 and 4. In these drawings the rings R may be taken as representing the annular growths of an exogenous tree, and hence when the trunk is sawed or split, as shown in Figs. 1 and 2, these rings appear as layers.

The smooth or substantially smooth face of the shingle thus split or sawed from the trunk is then subjected to an abrading action which successively removes a portion of the softer layers $r$ of the wood while leaving the harder intermediate layers R in rounded relief. To accomplish this result I may use either said blast or a rotary wire brush. For the purpose of this application I show at B such a brush.

The shingles are preferably supported on a moving conveyor C whereby they are successively passed under the brush with their tip ends foremost. During such action, the shingle support and brush are moved relative to one another, so as to regulate the depth of cut according to the taper of the shingle from its tip towards its butt end. As here shown, the brush is relatively stationarily mounted and the conveyor is progressively moved upwardly relative thereto, as by means of a cam 1, during the abrading action. This is shown diagrammatically in Figs. 8 to 11 inclusive wherein the several phases of the conveyor relative to the brush are illustrated in the treatment of a shingle.

My method thus involves quarter-sawing the shingle blank from the tree trunk and abrasively removing the softer portions thereof while leaving the harder intermediate portions in relief, preferably moving the shingle and abrading tool relative to each other during such abrasive action, whereby to regulate the depth of cut.

Various modifications in method and treatment may obviously be resorted to within the spirit and scope of my invention as defined by the appended claims.

What I therefore claim and desire to secure by Letters Patent is:—

1. The method of making an imitation hand rift shingle consisting in quarter-sawing the shingle blank from the wood of a conifer and in removing a portion of the softer layers of the wood while leaving exposed the harder intermediate layers in relief.

2. The method of making an imitation hand rift shingle consisting in quarter-sawing the shingle blank from the wood of a conifer and in abrasively removing a portion of the softer layers of the wood while leaving exposed the harder intermediate layers in relief.

3. The method of making an imitation hand rift shingle consisting in quarter-sawing the shingle blank from the wood of a conifer, in abrasively removing a portion of the softer layers of the wood while leaving exposed the harder intermediate layers in relief, and in relatively moving the shingle and abrasive means during the abrading action to regulate the depth of cut.

4. The method of making an imitation hand rift shingle, consisting in quarter-sawing the shingle blank from the wood of a conifer, in feeding the blank past an abrading tool to remove a portion of the softer layers of the wood while leaving exposed the harder intermediate layers in relief, and in progressively moving the blank towards said tool during such feeding action whereby to regulate the depth of cut.

5. In the method of making an imitation hand rift shingle from a quarter-sawed shingle blank that step which consists in removing a portion of the soft layers of the wood while leaving exposed the harder intermediate layers in relief.

6. In the method of making an imitation hand rift shingle from quarter-sawed shingle blanks that step which consists in abrading to remove a portion of the soft layers of wood while leaving the harder intermediate layers exposed in relief.

7. In the method of making an imitation hand rift shingle from quarter-sawed shingle blanks that steps which consists in abrading by a rotary brush to remove a portion of the soft layers of the wood while leaving the harder intermediate layers exposed in relief.

In testimony whereof I affix my signature.

CHARLES M. ABBOTT.